(12) United States Patent
Beyer et al.

(10) Patent No.: US 11,144,529 B2
(45) Date of Patent: Oct. 12, 2021

(54) CONSISTENT DATA REPLICATION IN AN EVENT-DRIVEN ARCHITECTURE

(71) Applicant: SAP SE, Walldorf (DE)

(72) Inventors: Bertram Beyer, Nussloch (DE); Niklas Schoenberger, Offenbach an der Queich (DE); Hans-Christian Kutschujawy, Mannheim (DE)

(73) Assignee: SAP SE, Walldorf (DE)

( * ) Notice: Subject to any disclaimer, the term of this patent is extended or adjusted under 35 U.S.C. 154(b) by 270 days.

(21) Appl. No.: 16/536,597

(22) Filed: Aug. 9, 2019

(65) Prior Publication Data

US 2021/0042285 A1 Feb. 11, 2021

(51) Int. Cl.
*G06F 16/23* (2019.01)
*G06F 16/2457* (2019.01)
*G06F 16/27* (2019.01)

(52) U.S. Cl.
CPC ...... *G06F 16/2329* (2019.01); *G06F 16/2365* (2019.01); *G06F 16/24573* (2019.01); *G06F 16/27* (2019.01)

(58) Field of Classification Search
CPC .......... G06F 16/24573; G06F 16/2365; G06F 16/27; G06F 16/275; G06F 16/2322; G06F 16/2329
See application file for complete search history.

(56) References Cited

U.S. PATENT DOCUMENTS

| | | | |
|---|---|---|---|
| 6,446,092 B1* | 9/2002 | Sutter | G06F 21/6227 |
| 7,406,499 B2* | 7/2008 | Singh | G06F 16/27 709/205 |
| 7,627,611 B2 | 12/2009 | Gusciora | |
| 9,910,759 B2* | 3/2018 | Shivaprasad | G06F 11/079 |
| 11,044,179 B1* | 6/2021 | Bettaiah | H04L 41/147 |
| 2003/0131027 A1* | 7/2003 | Holenstein | G06F 16/273 |
| 2006/0235715 A1* | 10/2006 | Abrams | G06Q 40/06 705/1.1 |
| 2006/0235831 A1* | 10/2006 | Adinolfi | G06Q 40/00 |
| 2006/0247944 A1* | 11/2006 | Calusinski, Jr. | G06Q 40/00 705/1.1 |
| 2007/0255763 A1* | 11/2007 | Beyerle | G06F 16/275 |
| 2015/0128152 A1* | 5/2015 | Lachaume | H04L 67/1095 719/316 |

(Continued)

FOREIGN PATENT DOCUMENTS

| | | |
|---|---|---|
| CA | 3054040 A1 | 9/2018 |
| WO | WO-2018178641 A1 | 10/2018 |

OTHER PUBLICATIONS

"Broker Semantics-Rabbitt MQ", [Online]. Retrieved from the Internet: <URL: https://www.rabbitmq.com/semantics.html#ordering>, (Accessed Nov. 19, 2020), 4 pgs.

(Continued)

*Primary Examiner* — Merilyn P Nguyen

(74) *Attorney, Agent, or Firm* — Schwegman Lundberg & Woessner, P.A.

(57) ABSTRACT

In an example embodiment, a replication state database is utilized in conjunction with a version clock to track changes to data in an event-driven architecture. The replication state database then can be used to ensure data consistency of the data. Opportunistic Concurrency Control can also be utilized to allow for parallel processing by instances.

20 Claims, 11 Drawing Sheets

(56) References Cited

U.S. PATENT DOCUMENTS

| | | | | |
|---|---|---|---|---|
| 2016/0103863 A1* | 4/2016 | Becker | ............... | G06F 16/211 707/741 |
| 2016/0179915 A1* | 6/2016 | Grebnov | ............... | G06F 16/27 707/624 |
| 2018/0113771 A1 | 4/2018 | Bourbonnais et al. | | |
| 2020/0320091 A1* | 10/2020 | Wu | ............... | G06F 16/2228 |

OTHER PUBLICATIONS

"Data considerations for microservices", Microsoft Docs, [Online], Retrieved from the Internet: <URL: https://docs.microsoft.com/en-us/azure/architecture/microservices/design/data-considerations>, (Feb. 25, 2019), 6 pgs.

"Designing interservice communication for microservices", [Online], Retrieved from the Internet: <URL: https://docs.microsoft.com/en-us/azure/architecture/microservices/design/interservice-communication>, (May 23, 2019), 8 pgs.

"ETag", MDN web docs, [Online], Retrieved from the Internet: <URL: https://developer.mozilla.org/en-US/docs/Web/HTTP/Headers/ETag, (Accessed Nov. 19, 2020), 8 pgs.

"European Application Serial No. 20189737.8, Extended European Search Report dated Nov. 9, 2020", 8 pgs.

"Event-driven architecture style", Microsoft Docs, [Online], Retrieved from the Internet: <URL: https://docs.microsoft.com/en-us/azure/architecture/guide/architecture-styles/event-driven>, (Aug. 30, 2018), 3 pgs.

"Logical clock", Wikipedia, [Online], Retrieved from the Internet: <URL: https://en.wikipedia.org/wiki/Logical_clock>, (Accessed Nov. 19, 2020), 2 pgs.

"Optimistic concurrency control", Wikipedia, [Online], Retrieved from the Internet: <URL: https://en.wikipedia.org/wiki/Optimistic_concurrency_control, (Accessed Nov. 19, 2020), 4 pgs.

Fowler, Martin, "What do you mean by "Event-Driven"?", [Online], Retrieved from the Internet: <URL: https://martinfowler.com/articles/201701-event-driven.html>, (Feb. 7, 2017), 5 pgs.

Rabelo, Juliano, "Foreign Key", [Online], Retrieved from the Internet: <URL: https://www.techopedia.com/definition/7272/foreign-key>, (Aug. 14, 2020), 7 pgs.

Richardson, Chris, "Pattern: Messaging", Microsoft Architecture, supported by Kong, [Online] Retrieved from the Internet: <URL: https://microservices.io/patterns/communication-style/messaging.html>, (Accessed Nov. 19, 2020), 3 pgs.

Richardson, Chris, "The Scale Cube", Microservice Architecture, supported by Kong, [Online], Retrieved from the Internet: <URL: https://microservices.io/articles/scalecube.html>, (Accessed Nov. 19, 2020), 2 pgs.

* cited by examiner

US 11,144,529 B2

CONSISTENT DATA REPLICATION IN AN EVENT-DRIVEN ARCHITECTURE

TECHNICAL FIELD

This document generally relates to systems and methods for use in event-driven architectures. More specifically, this document relates to consistent data replication in an event driven-architecture.

BACKGROUND

Event stream processing (ESP) is a set of technologies designed to assist the construction of event-driven information systems. ESP technologies may include event visualization, event databases, event-driven middleware, and event processing languages, or complex event processing (CEP). ESP deals with the task of processing multiple streams of event data with the goal of identifying the meaningful events within those streams. ESP enables applications such as algorithmic trading in financial services, radio frequency identification (RFID) event processing applications, fraud detection, process monitoring, and location-based services in mobile devices. ESP is generally limited to analyzing limited amounts of data; specifically, current ESP solutions are limited to analyzing the event streams in real time (e.g., the events happening right now) and events stored for limited windows (e.g., events that have happened in the last minute).

One common use for ESP technologies is in data replication. This is especially useful in cloud-based data management systems, where multiple services interact with each other and multiple versions of each service are running on different servers. There is a need in such systems to replicate changes to data performed by one instance of one service to other instances of the service as well as to other services. Because such event-driven services are asynchronous, however, it can be challenging to ensure consistency of the data. For example, if one instance of one service initiates a first change to a particular piece of data and then a second change to the same data, the events generated by those changes that are communicated to other instances of the service may not be received and processed by the other services in that same order, resulting in the possibility that, for example, another service may attempt to initiate the second change to the data prior to initiating the first change, which can cause data inconsistencies.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, a replication state database is utilized in conjunction with a version clock to track changes to data in an event-driven architecture. The replication state database then can be used to ensure data consistency of the data.

Figure 1:
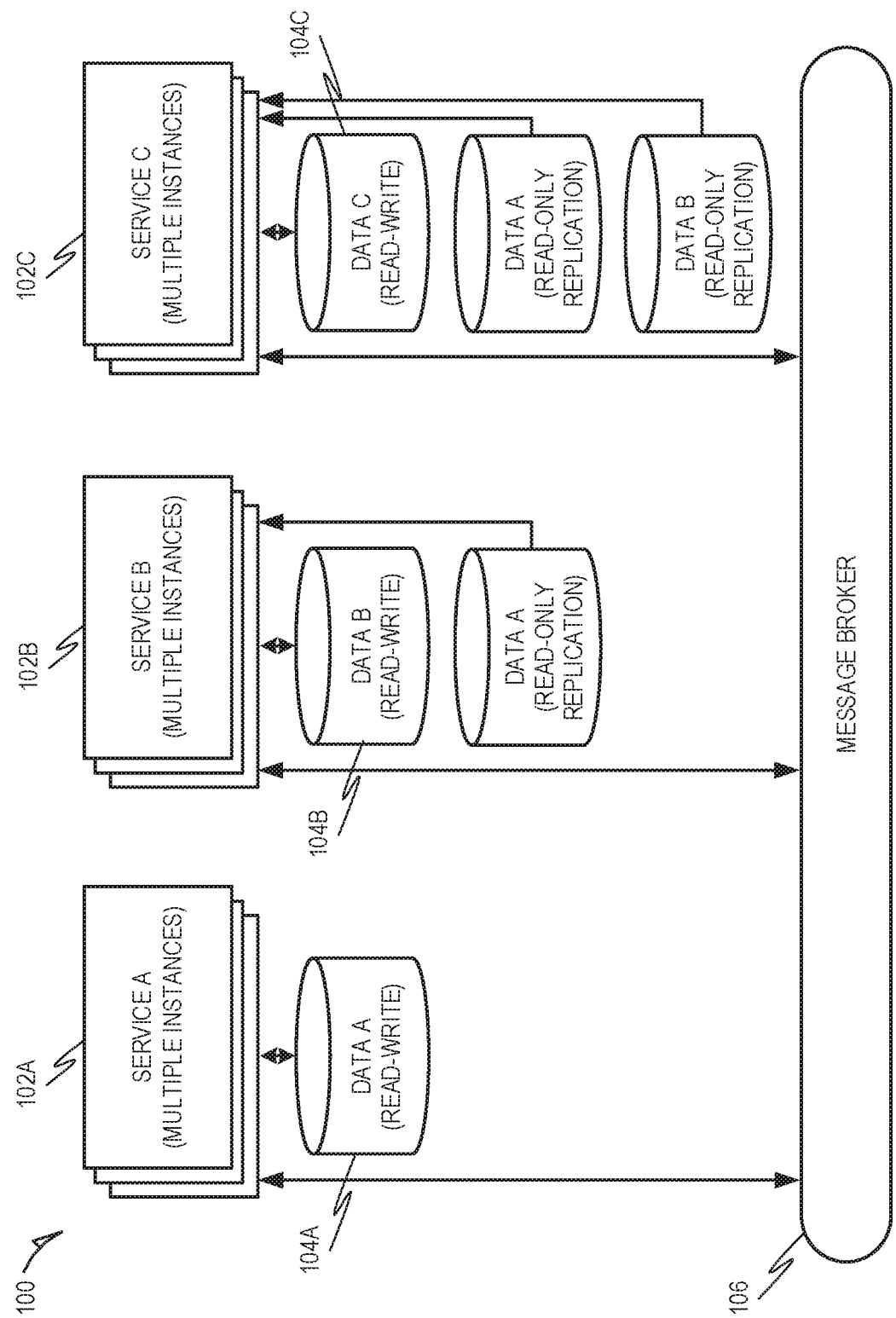
FIG. 1 is a block diagram illustrating an architecture for implementing an event-driven architecture in accordance with an example embodiment.

FIG. 1 is a block diagram illustrating an architecture 100 for implementing an event-driven architecture in accordance with an example embodiment. In one example embodiment, the architecture 100 may represent one application running in a cloud environment. The architecture may comprise several services 102A, 102B, 102C, each of which may have multiple instances operating on different cloud servers. These services 102A, 102B, 102C may have dependencies between each other. For example, service 102A may have data A 104A, and service 102B may be dependent on data A 104A as well as use data B 104B. Likewise, service 102C may be dependent on both data A 104A and data B 104B, as well as use data C 104C. While, for example, service 102A may be the only service capable of making changes to data A 104A (hence it is a producer of data A), read-only copies of data A 104A are maintained by services 102B and 102C.

To achieve a resilient system, which can also at least partially work when some components are unavailable, as well as to reduce coupling between the services 102A-102C and reduce latency of service operations, required data is not requested synchronously from the data producing service but instead is replicated in the consuming service. Thus, for example, if service 102B needs data A 104A, it does not ask service 102A for this data but instead uses its local copy of data A 104A.

The services 102A-102C avoid communicating with each other directly. Instead, a message broker 106 is used for inter-service communication. When a service, such as service 102A, creates, updates, or deletes data, it publishes a corresponding event to the message broker 106, which informs all interested services, such as services 102B and 102C, about the change. The event contains all the information used to maintain the data replication on the consumer-side, which is communicated by event-carried state transfer.

As described briefly above, each service 102A-102C may itself be run as multiple instances, which can be useful in addressing performance problems due to high load. In such situations, a service experiencing high load can add more instances to distribute the load over multiple servers. This is known as horizontal scaling.

As described above, a technical problem exists in ensuring that changes to data in an event-driven architecture are managed in a way that the data remains consistent among multiple instances of a service and across multiple services. Specifically, events may not be processed by their consumers in the same order as they are emitted by their producers. In scenarios where a queue has multiple subscribers, the message broker 106 cannot guarantee that the event messages will reach their recipients in the same order as they were published. One way to handle such issues is to introduce the concept of a version clock.

Figure 2:
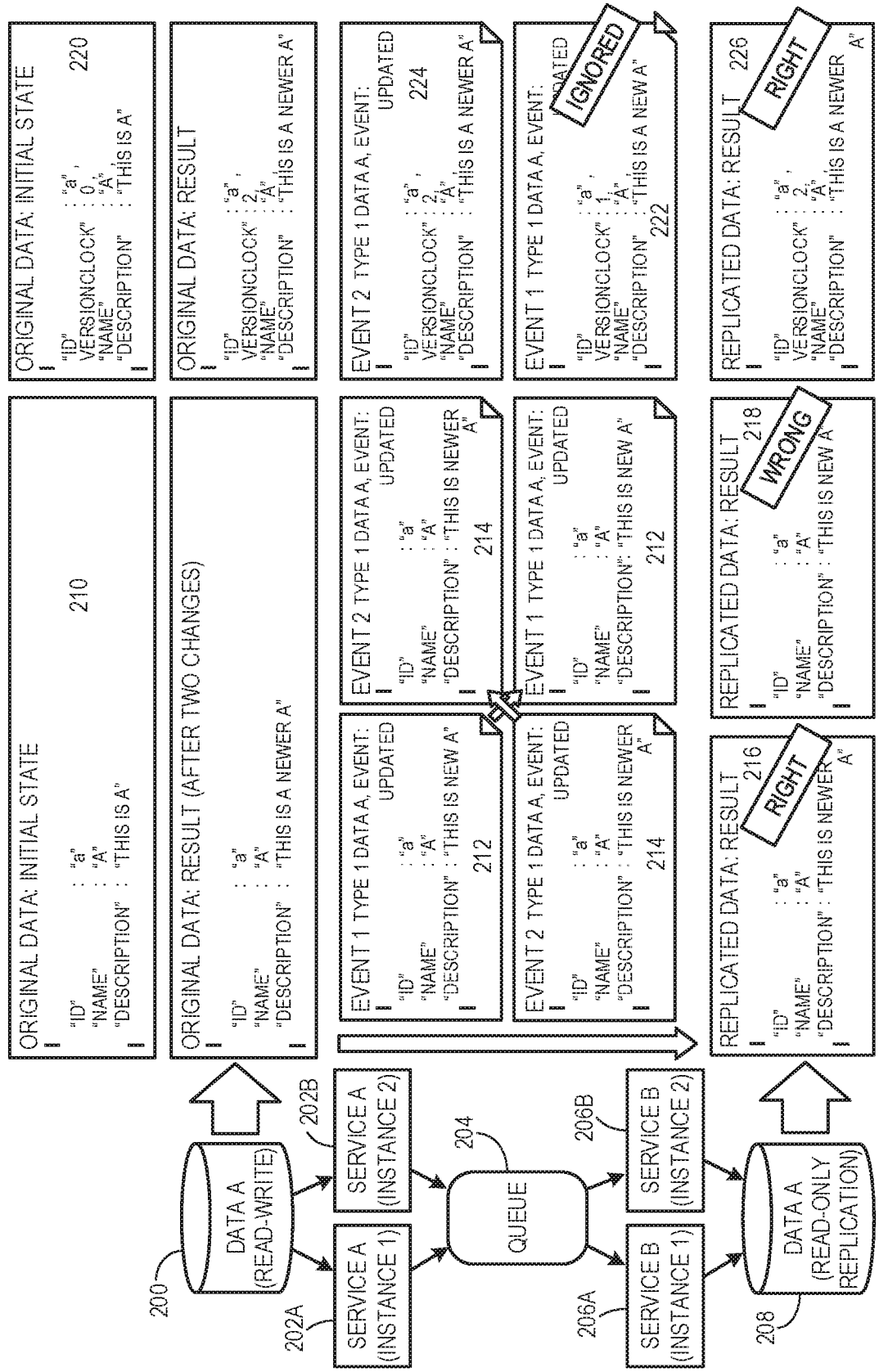
FIG. 2 is a block diagram illustrating use of a version clock in accordance with an example embodiment.

FIG. 2 is a block diagram illustrating use of a version clock in accordance with an example embodiment. Here, data A 200 is created, modified, or deleted by instances 202A, 202B of service A. When such actions are taken, corresponding events are generated and placed in a message broker queue 204, which then ends the events to instances 206A, 206B of service B, which uses these events to update its local copy 208 of data A.

Here, two changes are made to data A 200 by service A. The initial state 210 of the data without aversion clock indicates "This is A". Service A then changes this to "This is a new A", which causes event 212 to be generated and published. Then service A changes this again, to "This is a newer A," which causes event 214 to be generated and published. The problem is that the message broker cannot guarantee that event 212 reaches service B before event 214. The left side of the diagram illustrates the case where event 212 reaches service B before event 214. In this case, the replicated version 216 of data A in service B is correct ("This is a newer A"). The middle of the diagram illustrates the case where event 214 reaches service B before event 212. In this case, the replicated version 218 of service B is incorrect ("This is the new A").

In order to remedy this, a version clock can be used, which is depicted on the right side of the figure. In a version clock, each entity event contains a numeric version clock field, which represents a logical clock state. This may also be called a version counter. Thus, the data 220 in its original state may be given a version clock of 0. When the data 220 changes to "This is a new A," it is given a version clock of 1, and the event 222 generated based on this change is also given a version clock of 1. When it changes again to "This is a newer A," it is given a version clock of 2, and the event 224 generated based on this change is also given a version clock of 2.

As service B receives events, it saves a version clock with each piece of data it stores in the local copy. It checks the version clock of each incoming event and ignores any event with a version clock lower than a version clock of an event it has already received (as stored in the local copy). The result is that, if event 224 (having an event of 2) is received by service B before event 222, then event 222 (having a version clock of 1) is ignored, resulting in the correct replicated data result 226.

Using an event-carried state transfer implies that the information used to create or update the local copy of the entity instance is part of the event's payload. No additional request is needed to update the locally stored version.

One issue that arises, however, with the use of a version clock is that the version clock for a particular piece of data is usually stored with the data, such that when the data is deleted the version clock is also deleted. In order to remedy this, a replication state may be saved in a specialized replication state data structure, such as a table.

Figure 3:
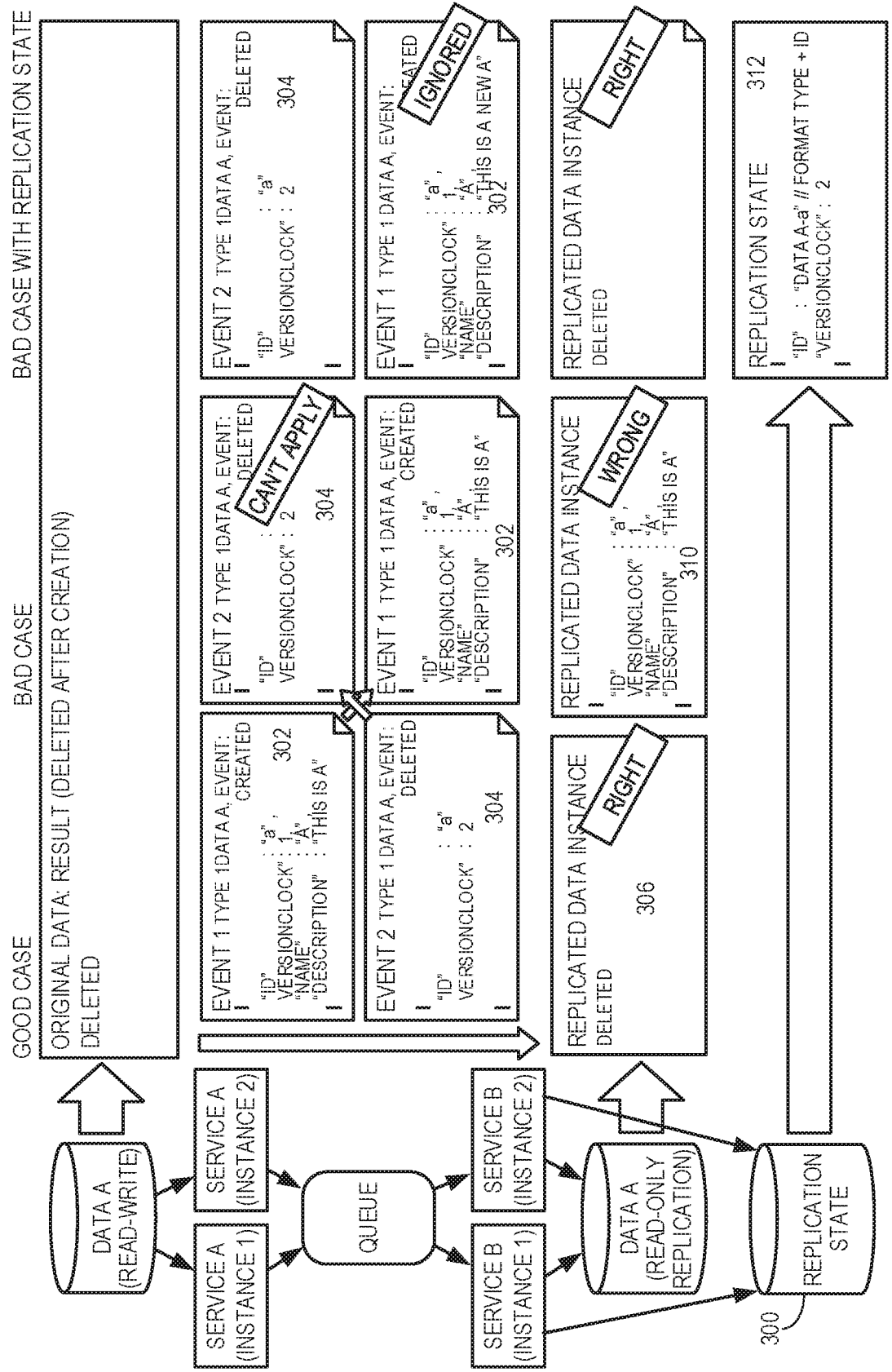
FIG. 3 is a block diagram illustrating use of a replication state data structure in accordance with an example embodiment.

FIG. 3 is a block diagram illustrating use of a replication state data structure 300 in accordance with an example embodiment. Here, service A creates data A, generating event 302, and then deletes data A, generating event 304, resulted in deleted record 306. The left side of the diagram illustrates the case where event 302 reaches service B before event 304. In this case, the replicated version of data A in service B is correct (deleted). The middle of the diagram illustrates the case where event 304 reaches service B before event 302. In this case, the replicated version 310 of service B is incorrect (not deleted), because event 304 was unable to be applied (it attempted to delete data that had not been created yet, possibly generating an error). Additionally, since there is no data for data A yet written in the local copy in service B, there is no place for the version clock of event 304 to be saved, and thus event 302 is processed normally when it is received, resulting in the creation of data A without a subsequent deletion.

As such, in an example embodiment, the replication state data structure stores an identifier and a corresponding version clock field for each piece of data that is the subject of an event it receives. The identification is one that is generated to be unique (service-wide) for the replicated entity. This can be achieved by concatenating a type of the piece of the entity with the identification of the entity. The version clock field is used to store the last processed entity version. Even a deleted event would not result in the entry of the replication state table being deleted, but it would result in the version clock field in the corresponding entry in the replication state table data structure being updated to the version clock attribute used in the deletion event.

Each service may then check the corresponding entry in the replication state table data structure to determine whether or not to ignore an incoming event. The right side of the figure depicts this process, with the replication state 312 from the replication state data structure 300 being used to verify that event 302 should be ignored.

In order for this to operate properly, a new entity instance gets created with the same entity identification as an entity that was deleted; the version clock should be higher than the version clock of the corresponding replicated state entry. In order for this to occur, the producer may utilize an entity-wide unique version clock to ensure that no entity of the same type will ever have the same version clock value. In an example embodiment, a global counter for this can be implemented using a structured query language (SQL) sequence. The order of all entity changes in the producer system is represented in that value.

Figure 4:
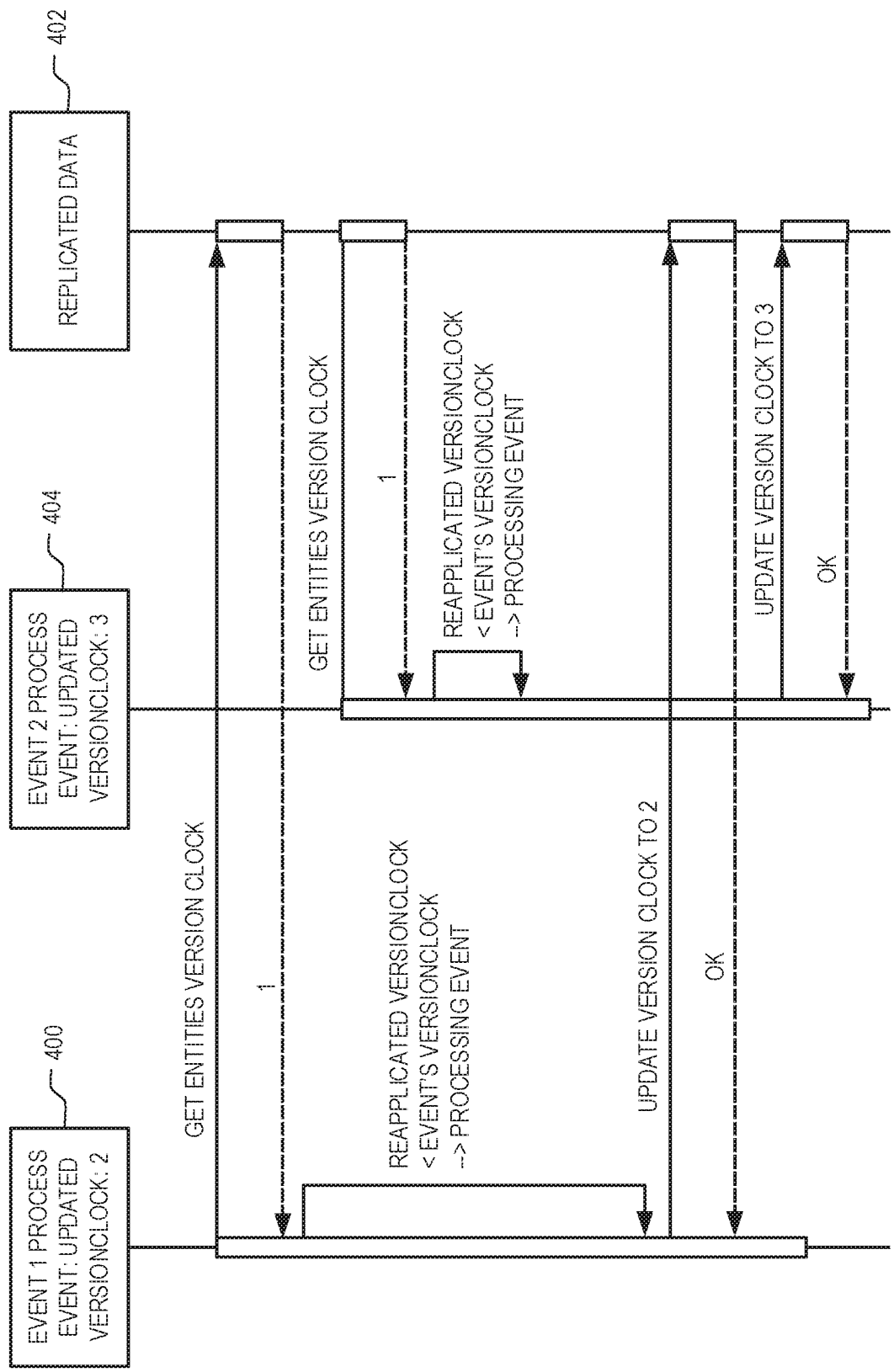
FIG. 4 is a sequence diagram illustrating parallel event processing without an inconsistency.

As the system runs multiple instances of consuming services, it is possible and indeed often desirable to have events be processed in parallel. This, however, can lead to a situation where the processing of one event outpaces another one. This can cause inconsistencies. FIG. 4 is a sequence diagram illustrating parallel event processing without an inconsistency. Here, a first event 400 is processed by a first node to change from version 1 to version 2. This results in a request to a replicated data table 402 for a version clock for the current version clock for the replicated data, which returns a "1". Since the replicated version clock is less than the event's version clock, the event is processed. While that is occurring, a second event 404 is processed by a second node to change from version 2 to version 3. It also requests the current version clock for the replicated data, which returns a "1". Since the replicated version clock is less than the event's version clock, the event is processed. Once the first event 400 has finished processing, it sends a message to the replicated data table 402 to update the version clock to 2. Then, once the second event 404 has finished processing, it sends a message to the replicated data table to update the version clock to 3. There are no inconsistencies because the first event 400 finished processing before the second event 404.

Figure 5:
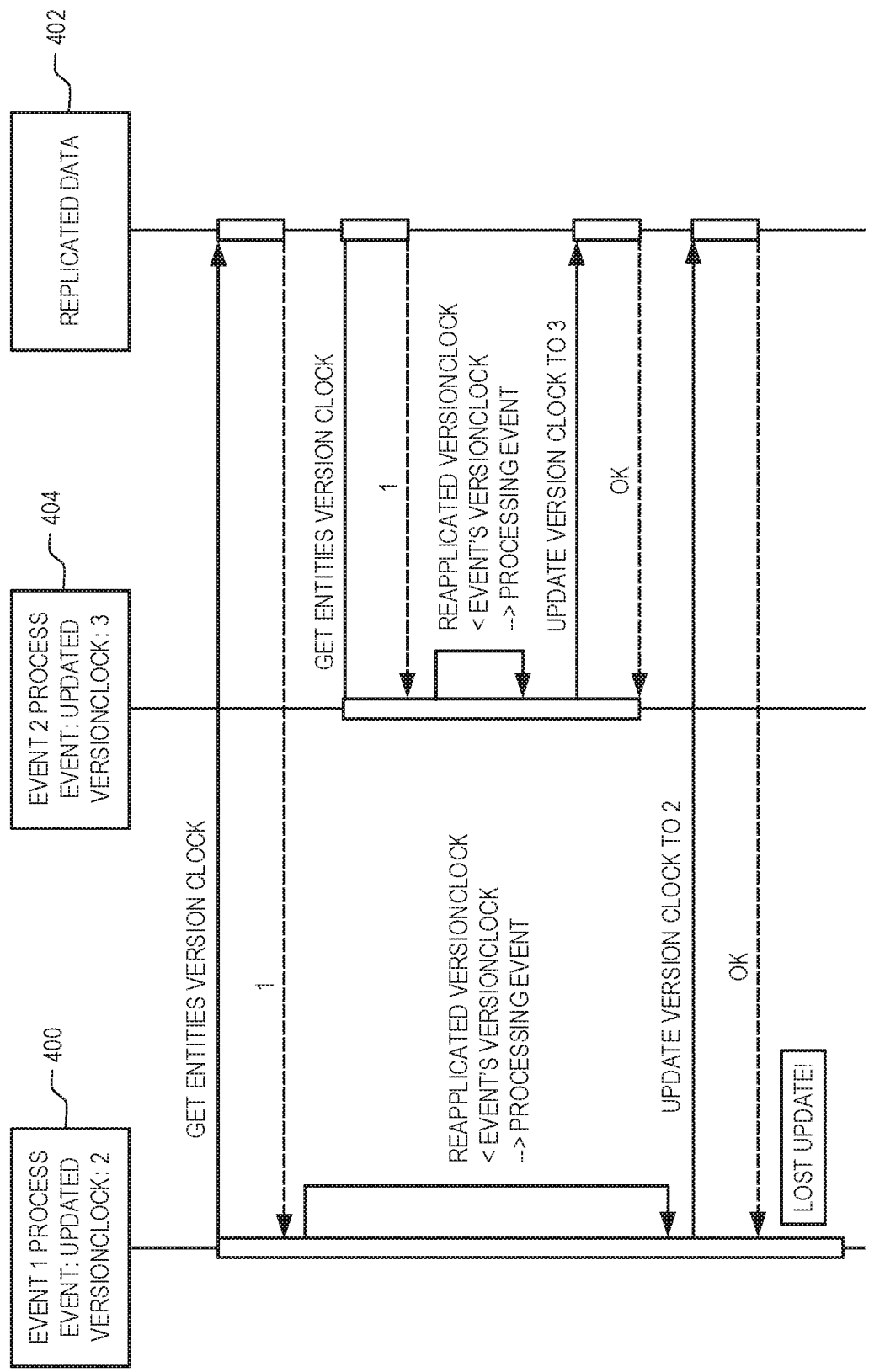
FIG. 5 is a sequence diagram illustrating parallel event processing with an inconsistency.

FIG. 5 is a sequence diagram illustrating parallel event processing with an inconsistency. Here, the second event 404 finishes processing before the first event 400, resulting in a request sent to the replicated data table 402 to update the version clock to 3. Once the first event 400 has finished processing, however, it sends a request to the replicated data table 402 to update the version clock to 2. The latest update of event 2 gets overwritten by event 1 and is lost.

One solution would be to use pessimistic locking. In pessimistic locking, the record is locked and prevented from being updated while it is in use. In this case, therefore, while the first event 400 is being processed, the second event 400 cannot update the replicated data table. While this prevents the inconsistency, it causes event processing to be serialized, which defeats the purpose of having multiple service instances running in parallel. In an example embodiment, optimistic concurrency control can be utilized to support parallel reads. Specifically, the replicated data table 402 can be enhanced with an attribute, named occTag. Processes that want to write data must assure that during writing time the occTag value is still the same value as it read before. Note that this differs from using the version clock for this function, as it serves the purpose of preventing concurrent operations on a replicated entity, not the purpose of compensating a missing order of the events. Specifically, if other scenarios allow a manipulation of the replicated data in the consumer service without the triggering of an event, the occTag can be updated. In such cases, the version clock is not updated internally as it indicates the sequence coming from the producer service.

Figure 6:
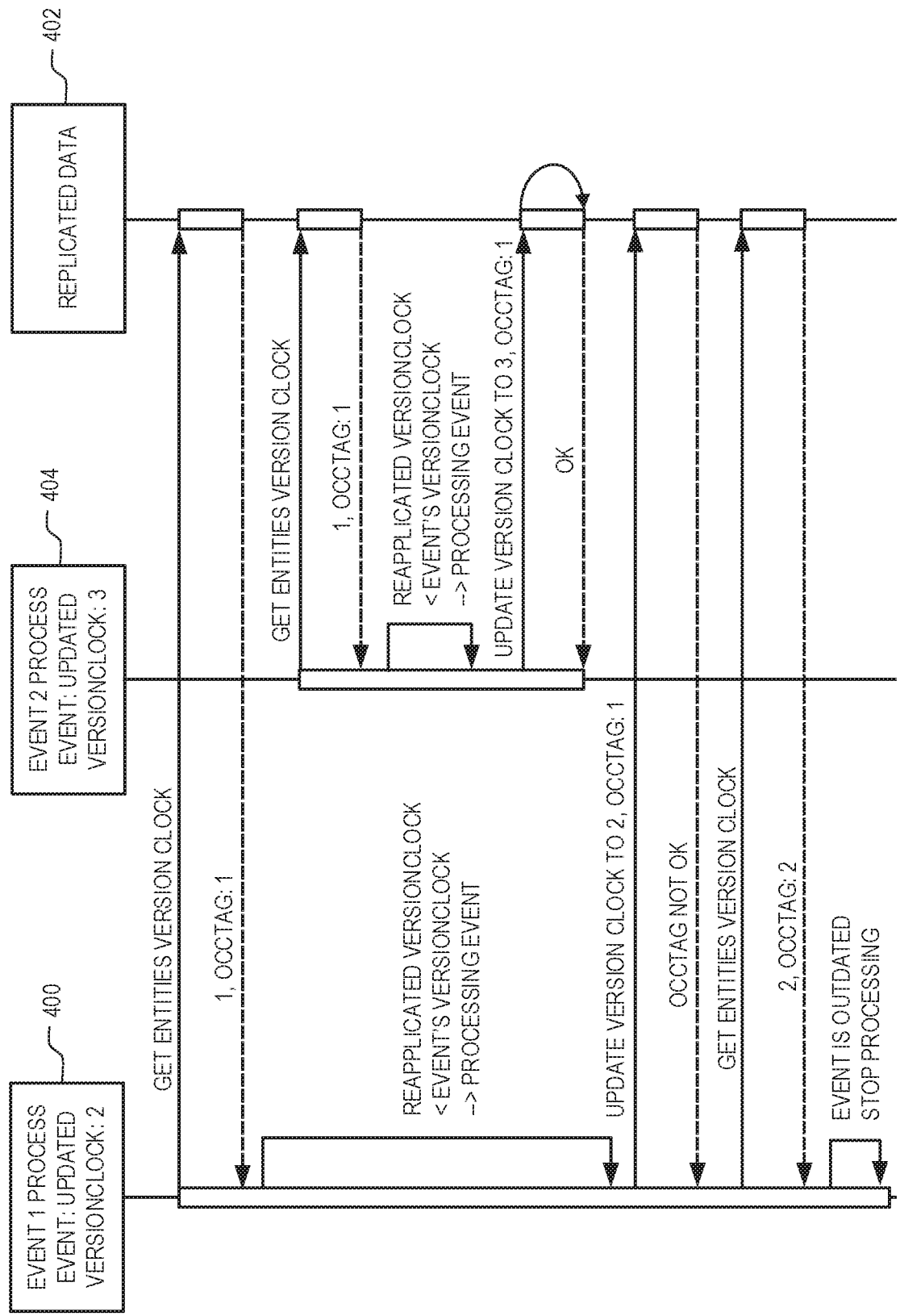
FIG. 6 is a sequence diagram illustrating parallel event processing using optimistic concurrency control.

FIG. 6 is a sequence diagram illustrating parallel event processing using optimistic concurrency control (OCC). Here, when first event 400 is processed, not only the version clock is retrieved from the replicated data table 402 but also the occTag. Likewise when the second event 404 is processed, not only the version clock is retrieved from the replicated data table 402 but also the occTag. When the second event 404 finished processing (before the first event 400 does), it not only updates the version clock in the replicated data table 402 to 3 but also updates the occTag to 2. Then, when the first event 400 finishes processing, it requests that the replicated data table update the version clock to 2 and informs it of the occTag of 1, which the replicated data table 402 identifies as out of date. The replicated data table 402 informs the first event 400 of which, so the node processing the first event 400 stops processing it as it is out of date.

Figure 7:
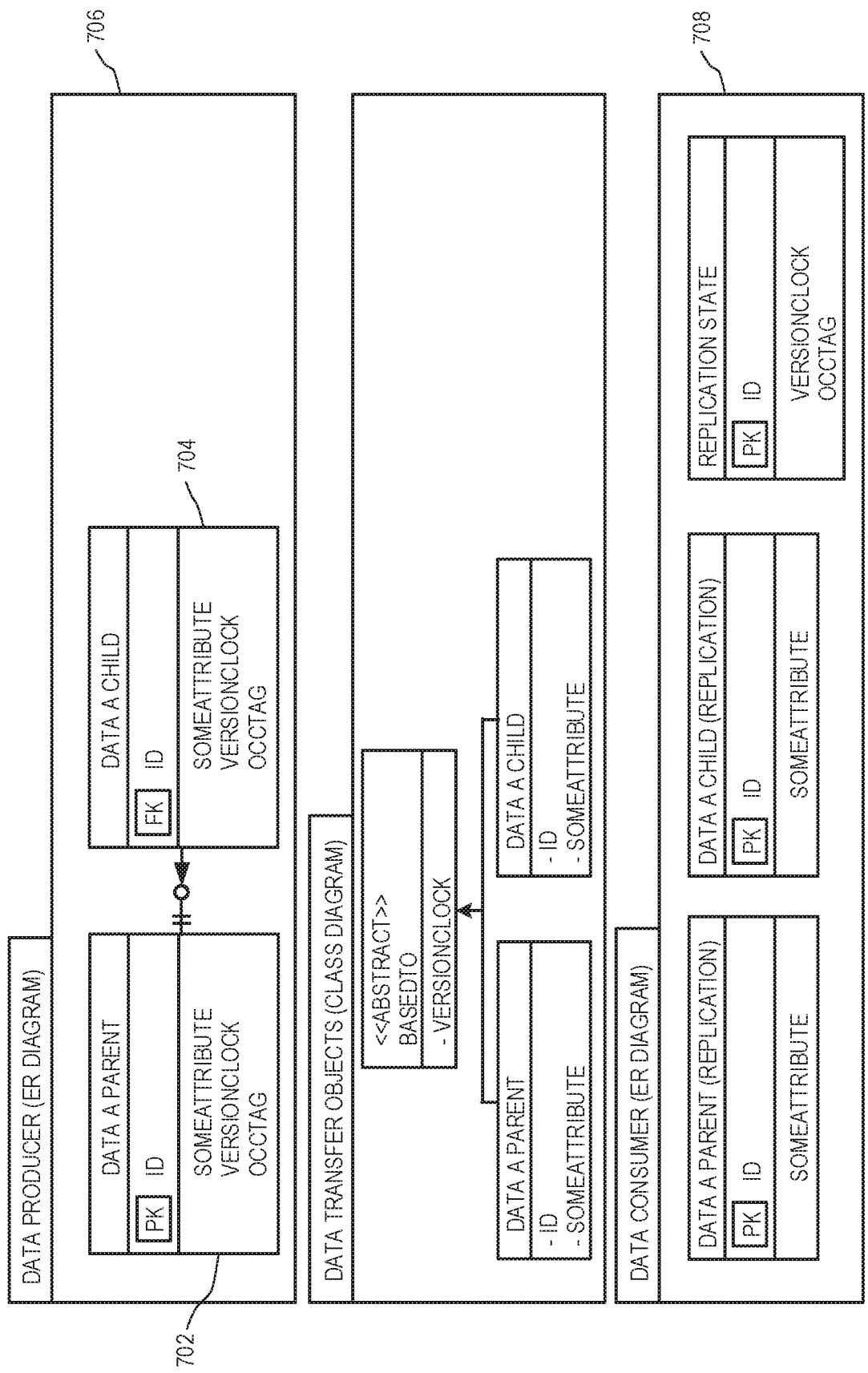
FIG. 7 is a block diagram illustrating producer and consumer data structure.

As the replicated data table 402 gets more complex, it comprises multiple substructures with references to each other. Normally, databases use foreign keys to guarantee referential integrity. This works well for data producing services. If the consumer side has no intention of changing the replicated data, however, then there is no need to cope with referential integrity. To avoid causing more problems, in an example embodiment, no foreign key relations are enforced on the consuming service. FIG. 7 is a block diagram illustrating producer and consumer data structure. Here, data A may comprise a parent data structure 702 and a child data structure 704. This is expressed on the data producer-side 706 with a foreign key relationship. On the data consumer-side 708, this is expressed without a foreign key relationship.

Figure 8:
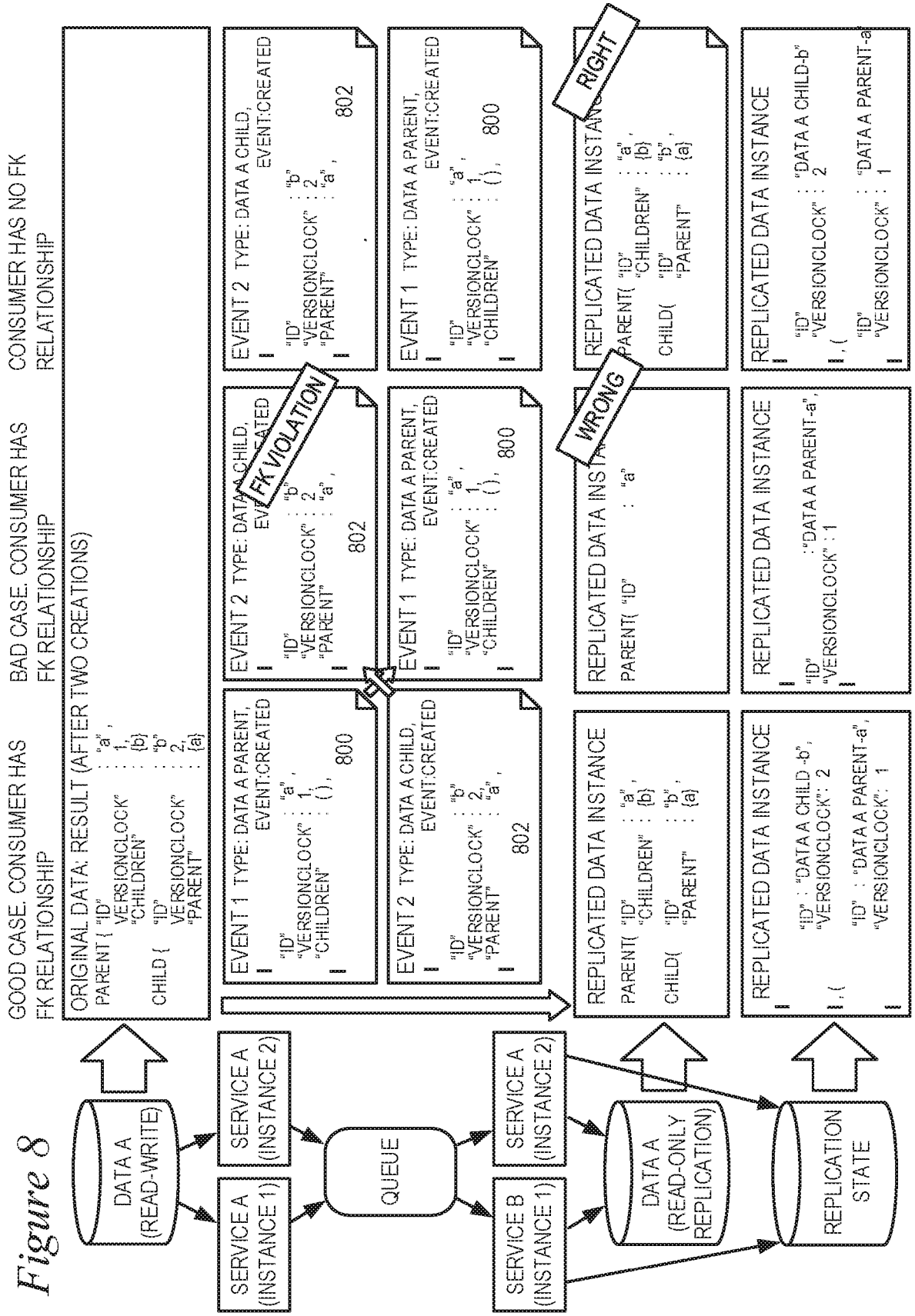
FIG. 8 is a block diagram illustrating a problem that could occur if a foreign key relationship was enforced on the data consumer-side.

FIG. 8 is a block diagram illustrating a problem that could occur if a foreign key relationship was enforced on the data consumer-side. Here, an event 800 creating the parent (702 from FIG. 7) (called event 1) is processed and an event 802 creating the child (704 from FIG. 7) (called event 2) is processed. On the left side of the diagram, even if a foreign key relationship is enforced, the events are received in the proper order, thus causing the parent to be created before the child in the replicated data. In the middle of the diagram, however, if a foreign key relationship is enforced, an error occurs because event 2 (event 802) is received before event 1 (event 800), and thus the child is created before the parent. A foreign key violation occurs upon the creation of the child, causing a failure in the database insertion of the child as the referential integrity is not known to be value. Essentially, event 1 (event 800) could be processed but event 2 (event 802) could not.

On the right side of the diagram of FIG. 8 is the case where the consumer-side has no foreign key enforcement. Thus, the child could be created before the parent. While this results in an inconsistent state for a short period of time, this can be solved by having the system implement mitigations to handle eventual consistency (such as retries).

Figure 9:
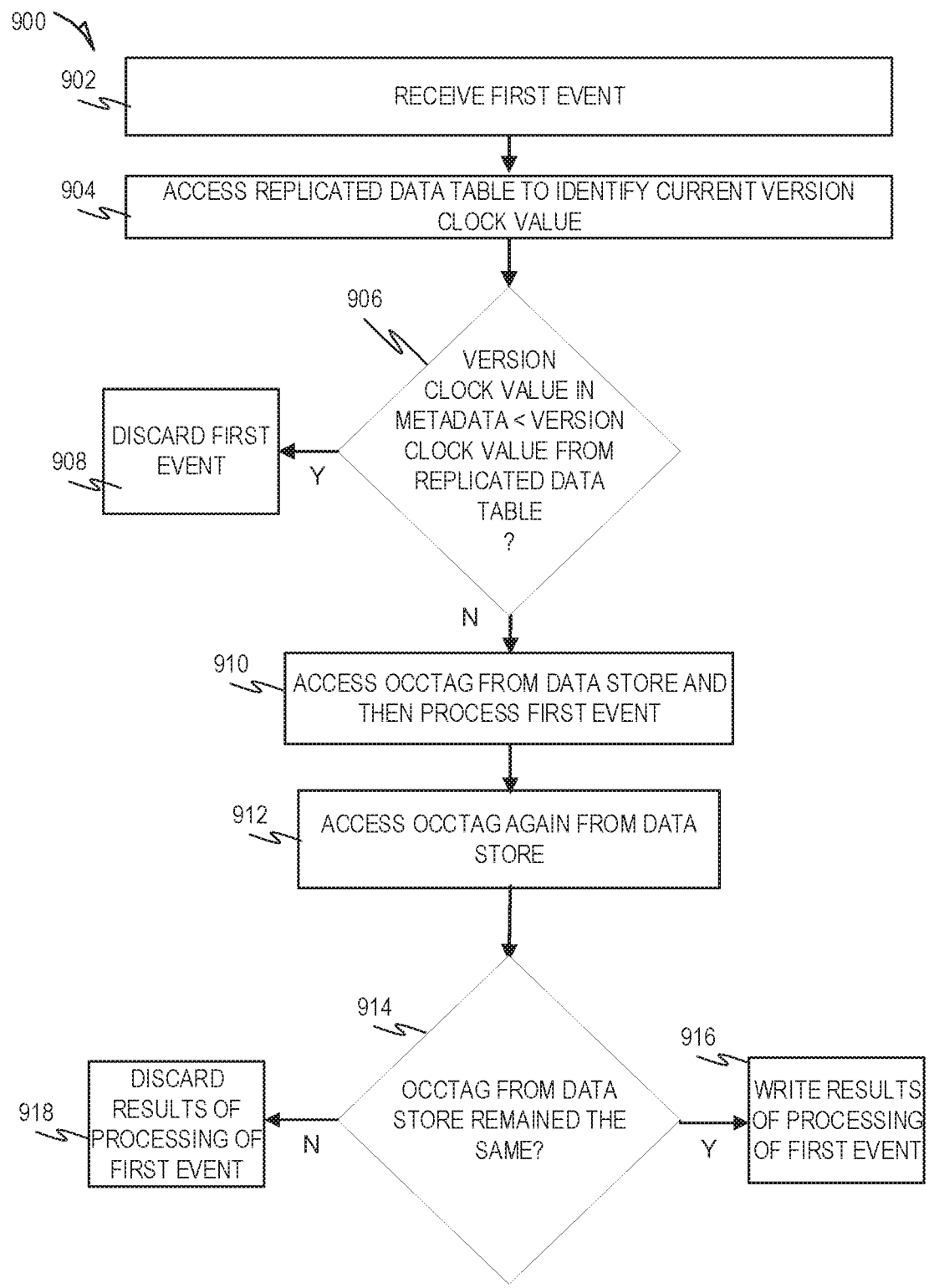
FIG. 9 is a flow diagram illustrating a method using a combination of a version clock and OCC, in accordance with an example embodiment.

FIG. 9 is a flow diagram illustrating a method 900 using a combination of a version clock and OCC, in accordance with an example embodiment. The method 900 may be performed by a first data consumer, although a similar method may be performed by the second data consumer and all other data consumers that share the same replicated data table (it should be noted, however, that the outcome of each of these operations may differ when performed on different data consumers as the order in which the events are received can change from data consumer to data consumer).

At operation 902, a first event pertaining to a first piece of data is received. The first event is generated by a data producer and includes metadata comprising an identification in an identification field and a version clock value in a version clock field. At operation 904, in response to the receiving, a replicated data table shared with a second data consumer is accessed to identify a current version clock value for the first piece of data.

At operation 906, it is determined if the version clock value in the metadata of the first event is less than the current version clock value for the first piece of data from the replicated data table. If so, then at operation 908 the first event is discarded without changing a local database to reflect the first event. If not, then at operation 910, an OCC tag is accessed from the data store and then the first event is processed. Then, at operation 912, the OCC tag is again accessed from the data store. The producer and the consumer have OCC tags internally to safeguard the writing operations into their data table. Then, at operation 914, it is determined whether the OCC tag has remained the same. If so, then at operation 916, the results of processing the first event are written into a data table. If not, then at operation 918 then the results of the processing of the first event are discarded.

EXAMPLES

Example 1. A system comprising:
at least one hardware processor; and
a computer-readable medium storing instructions that, when executed by the at least one hardware processor, cause the at least one hardware processor to perform operations comprising:
receiving, at a first data consumer, a first event pertaining to a first piece of data, the first event generated by a data producer and including metadata comprising an identification in an identification field and a version clock value in a version clock field;
in response to the receiving, accessing a replicated data table shared with a second data consumer, to identify a current version clock value for the first piece of data;
determining that the version clock value in the metadata of the first event is less than the current version clock value for the first piece of data from the replicated data table; and
in response to the determining, discarding the first event without changing a local database to reflect the first event.

Example 2. The system of Example 1, wherein the operations further comprise:
receiving, at the first data consumer, second event pertaining to the first piece of data, the second event generated by a data producer and including metadata comprising an identification in an identification field and a version clock value in a version clock field;
in response to the receiving of the second event, accessing the replicated data table shared with the second data consumer, to identify the current version clock value for the first piece of data;
determining that the version clock value in the metadata of the second event is not less than the current version clock value for the first piece of data from the replicated data table; and
in response to the determining that the version clock value in the metadata of the second event is not less than the current version clock value, processing the second event to cause a change in the local database to reflect the second event.

Example 3. The system of Examples 1 or 2, wherein the second data consumer also performs the receiving, accessing, and determining operations.

Example 4. The system of Examples 2 or 3, wherein the operations further comprise performing optimistic concurrency control (OCC) to permit parallel processing of events.

Example 5. The system of Example 4, wherein the operations further comprise:
receiving, at the first data consumer, a third event pertaining to the first piece of data, the second event generated by a data producer and including metadata comprising an identification in an identification field, a version clock value in a version clock;
in response to the receiving of the third event, accessing the replicated data table shared with the second data consumer, to identify the current version clock value for the first piece of data;
determining that the version clock value in the metadata of the third event is not less than the current version clock value for the first piece of data from the replicated data table;
accessing the replicated data table shared with the second data consumer, to identify a current OCC tag value for the first piece of data;
processing the third event;
re-accessing the replicated data table to identify a current OCC tag value for the first piece of data; and determining that the OCC tag value has changed;
in response to the determining that the OCC tag value has changed, discarding results of processing the third event without changing a local database to reflect the third event.

Example 6. The system of any of Examples 1-5, wherein no foreign key relationships are maintained by the first data consumer.

Example 7. The system of Example 6, wherein foreign key relationships are maintained by the data producer.

Example 8. A method comprising:
receiving, at a first data consumer, a first event pertaining to a first piece of data, the first event generated by a data producer and including metadata comprising an identification in an identification field and a version clock value in a version clock field;
in response to the receiving, accessing a replicated data table shared with a second data consumer, to identify a current version clock value for the first piece of data;
determining that the version clock value in the metadata of the first event is less than the current version clock value for the first piece of data from the replicated data table; and
in response to the determining, discarding the first event without changing a local database to reflect the first event.

Example 9. The method of Example 8, further comprising:
receiving, at the first data consumer, second event pertaining to the first piece of data, the second event generated by a data producer and including metadata comprising an identification in an identification field and a version clock value in a version clock field;
in response to the receiving of the second event, accessing the replicated data table shared with the second data consumer, to identify the current version clock value for the first piece of data;
determining that the version clock value in the metadata of the second event is not less than the current version clock value for the first piece of data from the replicated data table; and
in response to the determining that the version clock value in the metadata of the second event is not less than the current version clock value, processing the second event to cause a change in the local database to reflect the second event.

Example 10. The method of Example 8 or 9, wherein the second data consumer also performs the receiving, accessing, and determining operations.

Example 11. The method of Example 9 or 10, further comprising performing optimistic concurrency control (OCC) to permit parallel processing of events.

Example 12. The method of Example 11, wherein the method further comprises:
receiving, at the first data consumer, a third event pertaining to the first piece of data, the second event generated by a data producer and including metadata comprising an identification in an identification field, a version clock value in a version clock;
in response to the receiving of the third event, accessing the replicated data table shared with the second data consumer, to identify the current version clock value for the first piece of data;

determining that the version clock value in the metadata of the third event is not less than the current version clock value for the first piece of data from the replicated data table;
accessing the replicated data table shared with the second data consumer, to identify a current OCC tag value for the first piece of data;
processing the third event;
re-accessing the replicated data table to identify a current OCC tag value for the first piece of data; and
determining that the OCC tag value has changed;
in response to the determining that the OCC tag value has changed, discarding results of processing the third event without changing a local database to reflect the third event.

Example 13. The method of any of Examples 8-12, wherein no foreign key relationships are maintained by the first data consumer.

Example 14. The method of Example 13, wherein foreign key relationships are maintained by the data producer.

Example 15. A non-transitory machine-readable medium storing instructions which, when executed by one or more processors, cause the one or more processors to perform operations comprising:
receiving, at a first data consumer, a first event pertaining to a first piece of data, the first event generated by a data producer and including metadata comprising an identification in an identification field and a version clock value in a version clock field;
in response to the receiving, accessing a replicated data table shared with a second data consumer, to identify a current version clock value for the first piece of data;
determining that the version clock value in the metadata of the first event is less than the current version clock value for the first piece of data from the replicated data table; and
in response to the determining, discarding the first event without changing a local database to reflect the first event.

Example 16. The non-transitory machine-readable medium of Example 15, wherein the operations further comprise:
receiving, at the first data consumer, second event pertaining to the first piece of data, the second event generated by a data producer and including metadata comprising an identification in an identification field and a version clock value in a version clock field;
in response to the receiving of the second event, accessing the replicated data table shared with the second data consumer, to identify the current version clock value for the first piece of data;
determining that the version clock value in the metadata of the second event is not less than the current version clock value for the first piece of data from the replicated data table; and
in response to the determining that the version clock value in the metadata of the second event is not less than the current version clock value, processing the second event to cause a change in the local database to reflect the second event.

Example 17. The non-transitory machine-readable medium of Examples 15 or 16, wherein the second data consumer also performs the receiving, accessing, and determining operations.

Example 18. The non-transitory machine-readable medium of Examples 16 or 17, wherein the operations further comprise performing optimistic concurrency control (OCC) to permit parallel processing of events.

Example 19. The non-transitory machine-readable medium of Example 18, wherein the operations further comprise:
receiving, at the first data consumer, a third event pertaining to the first piece of data, the second event generated by a data producer and including metadata comprising an identification in an identification field, a version clock value in a version clock;
in response to the receiving of the third event, accessing the replicated data table shared with the second data consumer, to identify the current version clock value for the first piece of data;
determining that the version clock value in the metadata of the third event is not less than the current version clock value for the first piece of data from the replicated data table;
accessing the replicated data table shared with the second data consumer, to identify a current OCC tag value for the first piece of data;
processing the third event;
re-accessing the replicated data table to identify a current OCC tag value for the first piece of data; and
determining that the OCC tag value has changed;
in response to the determining that the OCC tag value has changed, discarding results of processing the third event without changing a local database to reflect the third event.

Example 20. The non-transitory machine-readable medium of any of Examples 15-20, wherein no foreign key relationships are maintained by the first data consumer.

Figure 10:
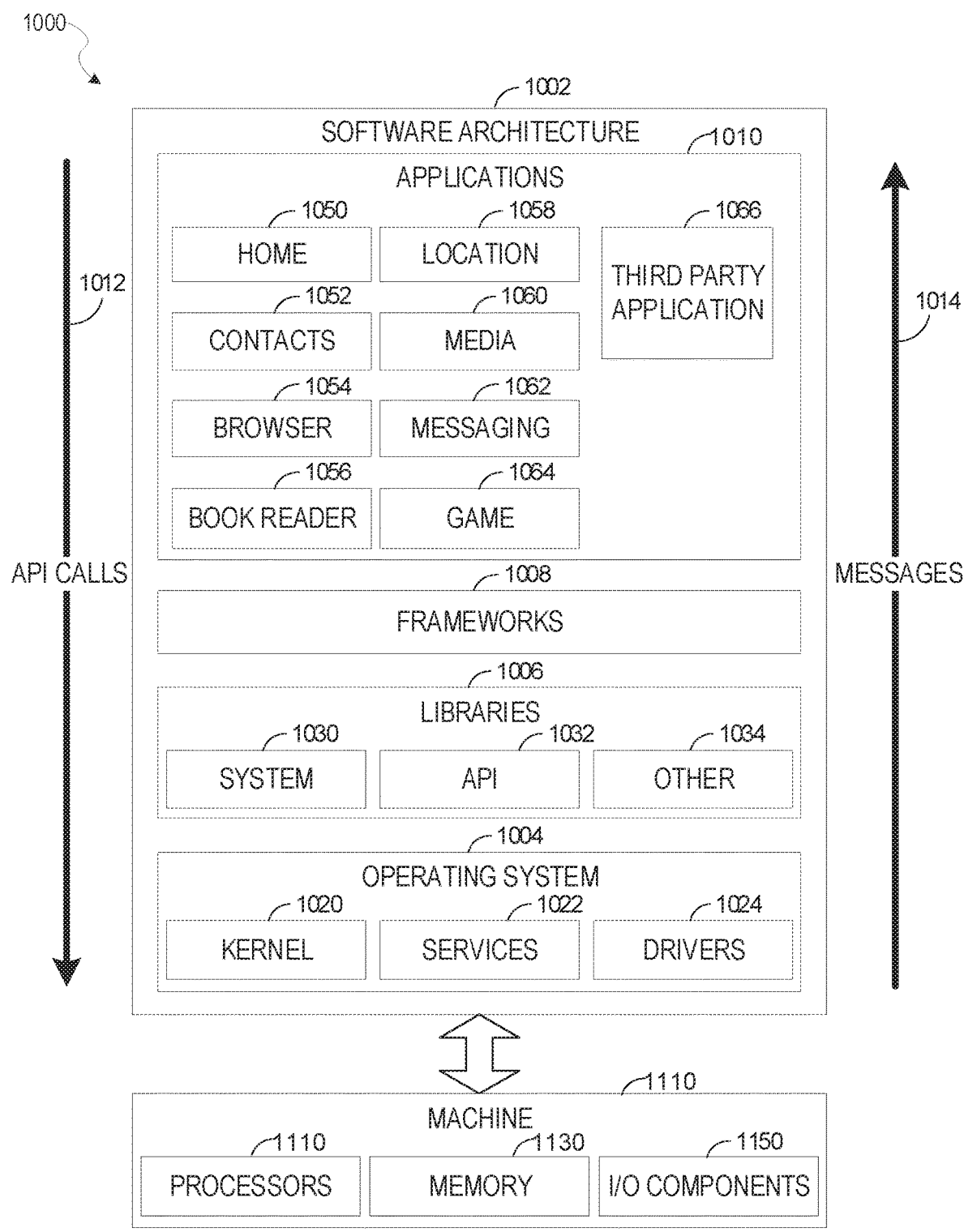
FIG. 10 is a block diagram illustrating an architecture of software, which can be installed on any one or more of the devices described above.

FIG. 10 is a block diagram 1000 illustrating an architecture of software 1002, which can be installed on any one or more of the devices described above. FIG. 10 is merely a non-limiting example of a software architecture, and it will be appreciated that many other architectures can be implemented to facilitate the functionality described herein. In various embodiments, the software 1002 is implemented by hardware such as a machine 1100 of FIG. 11 that includes processors 1110, memory 1130, and input/output (I/O) components 1150. In this example architecture, the software 1002 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke API calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphical user interface (GUI) functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications, such as a third-party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1066 can invoke the API calls 1012 provided by the operating system 1004 to facilitate functionality described herein.

Figure 11:
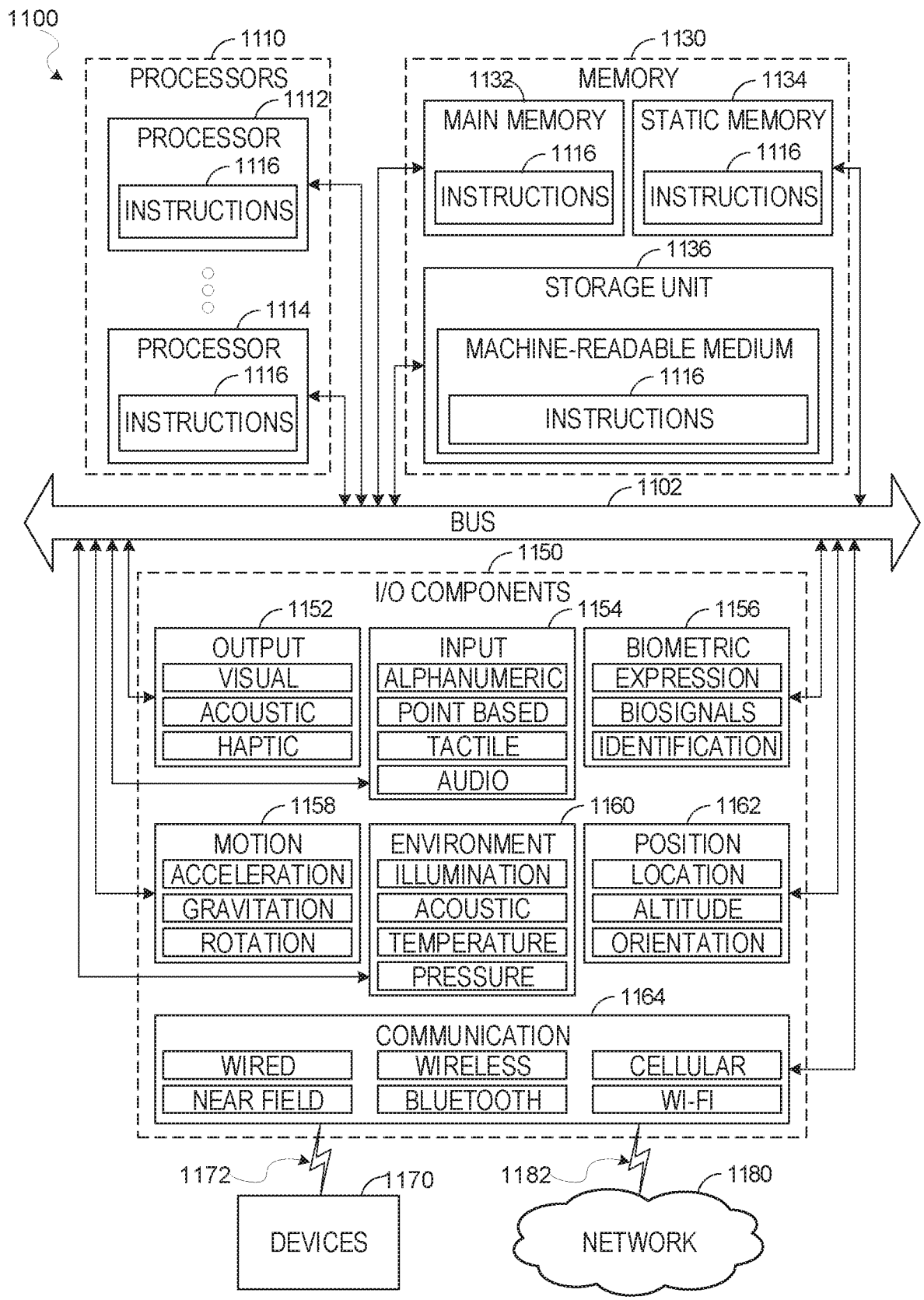
FIG. 11 illustrates a diagrammatic representation of a machine in the form of a computer system within which a set of instructions may be executed for causing the machine to perform any one or more of the methodologies discussed herein, according to an example embodiment.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute the method 900 of FIG. 9. Additionally, or alternatively, the instructions 1116 may implement FIGS. 1-9 and so forth. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute instructions 1116 contemporaneously. Although FIG. 11 shows multiple processors 1110, the machine 1100 may include a single processor 1112 with a single core, a single processor 1112 with multiple cores (e.g., a multi-core processor 1112), multiple processors 1112, 1114 with a single core, multiple processors 1112, 1114 with multiple cores, or any combination thereof.

The memory 1130 may include a main memory 1132, a static memory 1134, and a storage unit 1136, each accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion, and the grouping is in no way limiting. In various example embodiments, the I/O components 1150 may include output components 1152 and input components 1154. The output components 1152 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., coupled via a USB).

Moreover, the communication components 1164 may detect identifiers or include components operable to detect identifiers. For example, the communication components 1164 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

The various memories (i.e., 1130, 1132, 1134, and/or memory of the processor(s) 1110) and/or the storage unit 1136 may store one or more sets of instructions 1116 and data structures (e.g., software) embodying or utilized by any one or more of the methodologies or functions described herein. These instructions (e.g., the instructions 1116), when executed by the processor(s) 1110, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1180 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   receiving, at a first data consumer, a first event pertaining to a first piece of data stored in a local database, the first event generated by a data producer and including metadata comprising an identification in an identification field and a version clock value in a version clock field;
   in response to the receiving, accessing a replicated data table shared with a second data consumer, to identify a current version clock value for the first piece of data;
   determining that the version clock value in the metadata of the first event is less than the current version clock value for the first piece of data from the replicated data table; and
   in response to the determining, discarding the first event without changing the local database to reflect the first event.

2. The system of claim 1, wherein the operations further comprise:
   receiving, at the first data consumer, a second event pertaining to the first piece of data, the second event generated by a data producer and including metadata comprising an identification in an identification field and a version clock value in a version clock field;
   in response to the receiving of the second event, accessing the replicated data table shared with the second data consumer, to identify the current version clock value for the first piece of data;
   determining that the version clock value in the metadata of the second event is not less than the current version clock value for the first piece of data from the replicated data table; and
   in response to the determining that the version clock value in the metadata of the second event is not less than the current version clock value, processing the second event to cause a change in the local database to reflect the second event.

3. The system of claim 1, wherein the second data consumer also performs the receiving, accessing, and determining operations.

4. The system of claim 2, wherein the operations further comprise performing optimistic concurrency control (OCC) to permit parallel processing of events.

5. The system of claim 4, wherein the operations further comprise:
   receiving, at the first data consumer, a third event pertaining to the first piece of data, the second event generated by a data producer and including metadata comprising an identification in an identification field, a version clock value in a version clock;
   in response to the receiving of the third event, accessing the replicated data table shared with the second data consumer, to identify the current version clock value for the first piece of data;
   determining that the version clock value in the metadata of the third event is not less than the current version clock value for the first piece of data from the replicated data table;
   accessing the replicated data table shared with the second data consumer, to identify a current OCC tag value for the first piece of data;
   processing the third event;
   re-accessing the replicated data table to identify a current OCC tag value for the first piece of data; and
   determining that the OCC tag value has changed;
   in response to the determining that the OCC tag value has changed, discarding results of processing the third event without changing a local database to reflect the third event.

6. The system of claim 1, wherein no foreign key relationships are maintained by the first data consumer.

7. The system of claim 6, wherein foreign key relationships are maintained by the data producer.

8. A method comprising:
   receiving, at a first data consumer, a first event pertaining to a first piece of data stored in a local database, the first event generated by a data producer and including metadata comprising an identification in an identification field and a version clock value in a version clock field;

in response to the receiving, accessing a replicated data table shared with a second data consumer, to identify a current version clock value for the first piece of data;

determining, using a hardware processor, that the version clock value in the metadata of the first event is less than the current version clock value for the first piece of data from the replicated data table; and in response to the determining, discarding the first event without changing the local database to reflect the first event.

9. The method of claim 8, further comprising:

receiving, at the first data consumer, second event pertaining to the first piece of data, the second event generated by a data producer and including metadata comprising an identification in an identification field and a version clock value in a version clock field;

in response to the receiving of the second event, accessing the replicated data table shared with the second data consumer, to identify the current version clock value for the first piece of data;

determining that the version clock value in the metadata of the second event is not less than the current version clock value for the first piece of data from the replicated data table; and in response to the determining that the version clock value in the metadata of the second event is not less than the current version clock value, processing the second event to cause a change in the local database to reflect the second event.

10. The method of claim 8, wherein the second data consumer also performs the receiving, accessing, and determining operations.

11. The method of claim 9, further comprising performing optimistic concurrency control (OCC) to permit parallel processing of events.

12. The method of claim 11, wherein the method further comprises:

receiving, at the first data consumer, a third event pertaining to the first piece of data, the second event generated by a data producer and including metadata comprising an identification in an identification field, a version clock value in a version clock;

in response to the receiving of the third event, accessing the replicated data table shared with the second data consumer, to identify the current version clock value for the first piece of data;

determining that the version clock value in the metadata of the third event is not less than the current version clock value for the first piece of data from the replicated data table;

accessing the replicated data table shared with the second data consumer, to identify a current OCC tag value for the first piece of data;

processing the third event;

re-accessing the replicated data table to identify a current OCC tag value for the first piece of data; and determining that the OCC tag value has changed;

in response to the determining that the OCC tag value has changed, discarding results of processing the third event without changing a local database to reflect the third event.

13. The method of claim 8, wherein no foreign key relationships are maintained by the first data consumer.

14. The method of claim 13, wherein foreign key relationships are maintained by the data producer.

15. A non-transitory machine-readable medium storing instructions which, when executed by one or more processors, cause the one or more processors to perform operations comprising:

receiving, at a first data consumer, a first event pertaining to a first piece of data stored in a local database, the first event generated by a data producer and including metadata comprising an identification in an identification field and a version clock value in a version clock field;

in response to the receiving, accessing a replicated data table shared with a second data consumer, to identify a current version clock value for the first piece of data;

determining that the version clock value in the metadata of the first event is less than the current version clock value for the first piece of data from the replicated data table; and in response to the determining, discarding the first event without changing the local database to reflect the first event.

16. The non-transitory machine-readable medium of claim 15, wherein the operations further comprise:

receiving, at the first data consumer, second event pertaining to the first piece of data, the second event generated by a data producer and including metadata comprising an identification in an identification field and a version clock value in a version clock field;

in response to the receiving of the second event, accessing the replicated data table shared with the second data consumer, to identify the current version clock value for the first piece of data;

determining that the version clock value in the metadata of the second event is not less than the current version clock value for the first piece of data from the replicated data table; and in response to the determining that the version clock value in the metadata of the second event is not less than the current version clock value, processing the second event to cause a change in the local database to reflect the second event.

17. The non-transitory machine-readable medium of claim 15, wherein the second data consumer also performs the receiving, accessing, and determining operations.

18. The non-transitory machine-readable medium of claim 16, wherein the operations further comprise performing optimistic concurrency control (OCC) to permit parallel processing of events.

19. The non-transitory machine-readable medium of claim 18, wherein the operations further comprise:

receiving, at the first data consumer, a third event pertaining to the first piece of data, the second event generated by a data producer and including metadata comprising an identification in an identification field, a version clock value in a version clock;

in response to the receiving of the third event, accessing the replicated data table shared with the second data consumer, to identify the current version clock value for the first piece of data;

determining that the version clock value in the metadata of the third event is not less than the current version clock value for the first piece of data from the replicated data table;

accessing the replicated data table shared with the second data consumer, to identify a current OCC tag value for the first piece of data;

processing the third event;
re-accessing the replicated data table to identify a current OCC tag value for the first piece of data; and
determining that the OCC tag value has changed;
in response to the determining that the OCC tag value has changed, discarding results of processing the third event without changing a local database to reflect the third event.

20. The non-transitory machine-readable medium of claim 15, wherein no foreign key relationships are maintained by the first data consumer.

* * * * *